June 24, 1930.  J. LEDWINKA  1,767,465
SHEET METAL CONSTRUCTION FOR VEHICLE BODIES AND OTHER
SIMILAR BUILT-UP SHEET METAL STRUCTURES
Filed Dec. 21, 1927

INVENTOR.
JOSEPH LEDWINKA.
BY
ATTORNEY.

Patented June 24, 1930

1,767,465

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

SHEET-METAL CONSTRUCTION FOR VEHICLE BODIES AND OTHER SIMILAR BUILT-UP SHEET-METAL STRUCTURES

Application filed December 21, 1927. Serial No. 241,690.

My invention relates to the side header construction of vehicle bodies, and in particular to such a construction in sheet metal, and to the method of manufacture by which such construction is achieved.

It is an object of my invention to facilitate the joinder of a metal roof panel or the like with a metal side panel and a metal top rail, and to provide a strong, neat and durable joinder of these elements. I attain these objects by providing an openness of construction which facilitates the use of that very economical and secure method of joining, namely, by spot welding operations. To this end, where the roof panel or other overlapping member is joined to the side panel and to the top rail supporting the roof, I provide the top rail with an outer wall having spaced openings or cutout portions which openings permit the ready attachment by spot welding of the roof panel with the side panel which has previously been secured to the wall of the side rail as by welding through the portions of the wall between the openings or cut-out portions. This construction permits the weld marks made in joining the side panel to the top rail on the outside to be covered by the roof panel and those made in joining the roof panel to the side panel are brought into a position where they may be covered by the usual drip channel.

The strength of joinder and facility for joinder of roof and side panel is further enhanced by forming the roof panel adjacent its edge with an offset forming a shoulder adapted to fit over a corresponding shoulder on the side panel.

Figure 1:
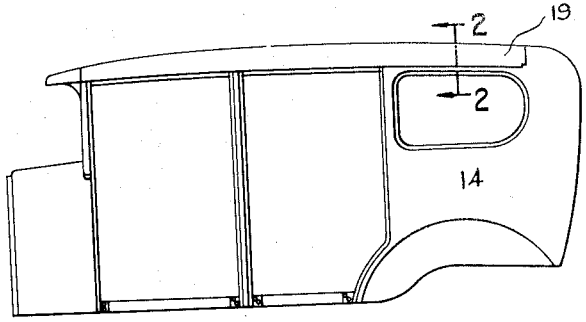

In the accompanying drawings, which illustrate a preferred form of my invention, Fig. 1 shows in side elevation a body of the sedan type to which my invention is applied.

Figure 2:
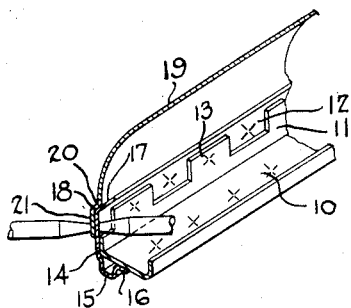
Figure 3:
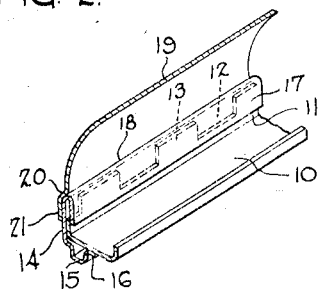

Figs. 2 and 3 are fragmentary views in perspective of the inside of the header construction of my invention taken substantially at the point indicated by the line 2—2 of Fig 1. Fig. 2 showing the joint completed except for the turning down of the edge of the side panel, and Fig. 3 showing the completed structure.

In the drawings, I have shown my invention applied to the construction directly above the rear quarter window opening of a sedan type of body, the top rail being represented by an upwardly presenting channel member 10, which has its outer vertical side wall 11 of greater height than the inner side wall, and this outer side wall is formed with spaced openings 12 which alternate with intermediate uncut portions or tabs 13.

The side panel covering the header is designated 14 and has its lower portion at the window opening extended some distance below the top rail and bent reversely at 15 and then flanged laterally at 16, through which flange it may be secured, as by spot welding, to the bottom wall of the channel rail. The side panel lies against the outside wall of the top rail and is secured thereto by spot welding through the panel and the uncut portions or tabs 13 between the openings through the top rail. Prior to assembly with the roof the upper edge of the side panel extends some distance above the outer side wall 11 of the top rail and is deflected inwardly, as shown at 17, Fig. 2, thereby forming a shoulder 18 on its outer surface.

The roof panel 19 is offset outwardly adjacent its edge thereby forming a shoulder 20 and an offset portion 21 beyond said shoulder. This shoulder not only aids in locating the roof panel by its engagement with the shoulder 19 on the side panel during assembly but also helps to take the weight of the roof after assembly. The roof is rigidly joined to the side panel and through it to the header by having the offset portion 21, which overlaps the outside of the side panel and covers the weld marks formed therein by welding it to the side rail, spot welded to the side panel, access being had to the inside of the side panel, so that welding takes place through two thicknesses of metal only, a prerequisite for most efficient joinder by spot welding, through the openings or gaps 12 formed in the side wall 11 of the rail.

After the roof panel is welded in position, the inwardly edge 17 of the side panel is turned down over the outer wall 11 of the side rail to finish the joint as shown in Fig. 12.

The roof joint, so made, is located at the usual location of the drip channel (not shown) which, when secured in place, covers any weld marks left in the roof panel by welding it to the side panel.

The formation of the side panel with the reversely bent and flanged lower portion 15, 16 and with the upper inturned portion 17 aids in readily locating it in proper position on the top rail in assembling, and thus facilitates the assembly.

While I have shown my invention as applied to a construction including header rail, side panel and roof panel, it will be understood that it is likewise applicable to other constructions in which three sheet metal members are joined by spot welding along the edge of one of said members, and I do not desire to be limited to the application of my invention to the particular construction shown.

What I claim is:

1. A side header construction for vehicle bodies comprising an angular side rail having its outer vertically extending wall formed with spaced openings, a side panel having its upper edge secured to said wall and a roof panel having its lower edge overlapping and spot welded to the upper edge of the side panel at said openings.

2. A side header construction for vehicle bodies comprising an angular side rail having its outer vertically extending wall formed with alternate tabs and recesses, a side panel having its upper edge secured to said wall and a roof panel having its lower edge overlapping and spot welded to the upper edge of the side panel at the recesses.

3. A sheet metal constructon for vehicle bodies and other similar built-up sheet metal structures comprising an inner metal stamping having its edge portion formed with spaced openings, an outer metal panel overlapping said edge portion and welded thereto, and a third metal member overlapping the outside of said panel and spot welded to the panel in said openings.

4. A sheet metal construction for vehicle bodies comprising an inner sheet metal member having its edge formed with alternate tabs and recesses, an outer panel overlapping said edge portion and secured thereto by spot welding, and a third metal member joined to the outside of said panel by spot welding at said recesses.

In testimony whereof I hereunto affix my signature.

JOSEPH LEDWINKA.